(12) United States Patent
Kuo

(10) Patent No.: US 7,438,478 B2
(45) Date of Patent: Oct. 21, 2008

(54) LIGHT-GUIDING DEVICE HAVING A SLEEVE PART ABLE TO BE MOUNTED ON A THROUGH HOLE OF A PANEL

(75) Inventor: Ho-Wen Kuo, Taipei (TW)

(73) Assignee: Inventec Corporation, Taipei (TW)

( * ) Notice: Subject to any disclaimer, the term of this patent is extended or adjusted under 35 U.S.C. 154(b) by 146 days.

(21) Appl. No.: 11/378,018

(22) Filed: Mar. 17, 2006

(65) Prior Publication Data

US 2007/0041218 A1 Feb. 22, 2007

(30) Foreign Application Priority Data

Aug. 17, 2005 (TW) .............................. 94214053 U

(51) Int. Cl.
*G02B 6/36* (2006.01)
(52) U.S. Cl. .............................. 385/53; 385/88; 385/90; 385/91; 385/92
(58) Field of Classification Search .................... 385/53, 385/88, 90, 91, 92
See application file for complete search history.

(56) References Cited

U.S. PATENT DOCUMENTS

| 4,919,513 A | * | 4/1990 | Nakakuki et al. ............ 385/127 |
| 2001/0010741 A1 | * | 8/2001 | Hizuka ......................... 385/55 |

FOREIGN PATENT DOCUMENTS

CN     02235580.4     1/2004

* cited by examiner

*Primary Examiner*—Frank G Font
*Assistant Examiner*—Jerry Blevins
(74) *Attorney, Agent, or Firm*—Jianq Chyun IP Office

(57) ABSTRACT

A light-guiding device applicable to a panel having at least a through hole includes a sleeve part and a light guide. The sleeve part is able to be mounted on the through hole, and includes a first combining portion and a positioning portion corresponding to the panel for positioning the sleeve portion on the panel. The light guide includes a second combining portion for engaging with the first combining portion, so as to fix the light guide on the panel in cooperation with the sleeve part, allowing an assembling/disassembling process of the light-guiding device to be easily performed.

8 Claims, 5 Drawing Sheets

LIGHT-GUIDING DEVICE HAVING A SLEEVE PART ABLE TO BE MOUNTED ON A THROUGH HOLE OF A PANEL

BACKGROUND OF THE INVENTION

1. Field of the Invention

The present invention relates to light source guiding techniques, and more particularly, to a light-guiding device having a sleeve part able to be mounted on a through hole of a panel.

2. Description of Related Art

With the explosive development of the electronic industry, an electronic product comprises more and more circuit components and mechanical components, and has a complicated structure. Take a network server as the example, if any one of a plurality of components of the network breaks down, a severe result usually happens accordingly, such as data damage or lost, or leading the whole network server to operate abnormally. For this purpose, network server designers usually install a plurality of indicator lights corresponding to components prone to damage, and users can therefore determine whether the network server system is operating normally based on certain lighting statuses of the indicator lights. The corresponding lighting status of the indicator lights can be displayed directly and a user can observe the breakdown and take efficiently corresponding measures in time without processing complicated checking actions when a breakdown occurs in the server system. This method is simple and easy to understand, and also can achieve the effects of accurate determination and convenient management.

However, in the structure design of modern servers, the indicator lights are installed in a casing, rather than on a surface, of the server. Therefore, when a shell or panel are installed to protect circuit elements or mechanical elements of the server, the indicator lights may be covered by the shell or panel, and the user is hardly to observe the lighting status of the indicator lights and unable to determine the operating status of the server system accurately. It is very inconvenient for the user to observe the indicator light via a through hole even the panel has a plurality of through holes, and there are too many visual dead angles to observe the lighting status of the indicator light clearly, thereby determination error occurs frequently. In order to overcome the above defect, if the indicator lights are moved to the panel of the server, current server structures need to be redesigned, such that the whole cost increases greatly, resulting the industrial applicability valueless.

Therefore, a technique utilizing a light-guiding pillar to realize light conduction is developed. In this technique, a plurality of light-guiding pillars are intergrally formed or adhesively fixed on the corresponding positions of the panel. Although this method may conduct the light source of the indicator light to the surface of the panel for a user to observe directly and beneficially, since an additional process or modification of a manufacturing mold of the panel is needed, causing the cost increases, and the whole panel needs to be replaced when any one of the light-guiding pillars damages or ages, causing the maintain cost is expensive, thereby not beneficial for industrial applicability.

China patent application No. 02235580.4 disclosed an electronic device having indicator lights. A light-guiding hole is installed on an indicator light panel of the electronic device, and a transparent spacer layer is mounted on the light-guiding hole. A light-guiding pillar is installed between the transparent spacer layer and the indicator light. It is beneficially to observe and maintain by transmitting the light signal of the farther end indicator light to the corresponding light-guiding hole of the corresponding indicator light panel. However, not only a transparent spacer layer needs to be provided in the panel (indicator light panel), but also no suggestion about how to set the light-guiding pillar between the transparent spacer layer and the indicator light is provided in this prior art. Therefore, it does not overcome the above drawbacks of the conventional technique yet.

Therefore, how to develop a light-guiding device to overcome the above drawbacks to make it easy to assemble and disassemble, simplified structure, high reuse ability, and save the cost is a problem to be solved urgently just now.

SUMMARY OF THE INVENTION

In light of the above drawbacks in the prior art, a primary objective of the present invention is to provide an easily assembled/disassembled light-guiding device.

Another objective of the present invention is to provide a light-guiding device having a simplified structure.

Still another objective of the present invention is to provide a reusable light-guiding device.

A further objective of the present invention is to provide a light-guiding device of low cost.

In accordance with the above and other objectives, the present invention proposes a light-guiding device applicable to a panel having at least a through hole. The light-guiding device includes a sleeve part and a light guide. The sleeve part is able to be mounted on the through hole, and includes a first combining portion and a positioning portion corresponding to the panel for positioning the sleeve portion on the panel. The light guide includes a second combining portion for engaging with the first combining portion, so as to fix the light guide to the panel in cooperation with the sleeve part.

In the preferred embodiment, the sleeve part further includes a holding portion, and the first combining portion is formed on a side of the holding portion. The first combining portion is a groove formed in an inner side of the holding portion, and the holding portion includes two holding parts for holding the light guide. The positioning portion includes a sleeve head formed at an end of the sleeve part, and an inverted hook formed on an outer side of the sleeve part. The sleeve part is able to be fixed to the panel by the sleeve head and the inverted hook.

The light guide is an acrylic light-guiding pillar. The second combining portion is a bump formed in the outer side of the light guide. The light guide further includes an expanding portion. Preferably, the expanding portion is a conical structure formed at an end of the light guide.

Compare with the prior art, the light-guiding device of the present invention relates primarily to a light guide having a second combining portion for engaging with a first combining portion to fix the light guide on the panel is cooperation with the sleeve part, so as to overcome the drawbacks of the prior art, such as hard to assemble and disassemble, complicated structure, low reuse ability, high cost, and so on, thereby achieving the effects of easy to assemble and disassemble, simplified structure, high reuse ability, and reducing cost.

BRIEF DESCRIPTION OF DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

The present invention is described in the following with a specific embodiment, so that one skilled in the pertinent art can easily understand other advantages and effects of the present invention from the disclosure of the invention. The present invention may also be implemented and applied according to other embodiments, and the details may be modified based on different views and applications without departing from the spirit of the invention.

FIGS. 1 to 5 are diagrams drawn according to the preferred embodiments of the light-guiding device of the present invention. These drawings are simplified diagrams schematically illustrating the basic structure of the present invention, therefore, only display the compositions related to the present invention. Further, the displayed compositions are not drawn in accordance with the amount, shape, and dimensional ratio during implementing. The actual amount, shape, and dimensional ratio during implementing may be a kind of selective design, and the types of composition layout may be more complicated.

Figure 1:
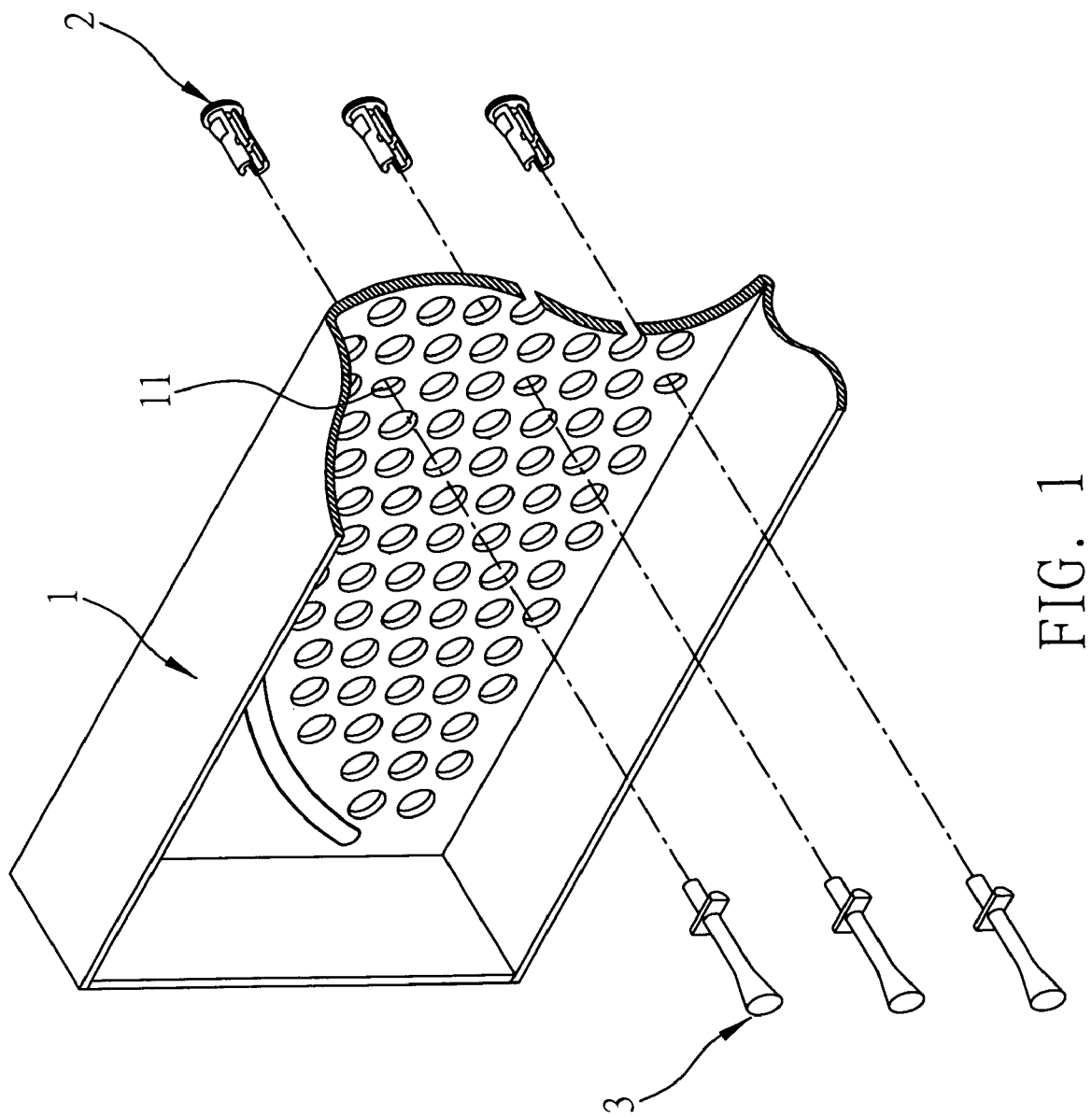
FIG. 1 is an explosive view of a panel and a light-guiding device of the preferred embodiment according to the present invention.

FIG. 1 is an explosive view illustrating a panel 1 and a light-guiding device of the preferred embodiment according to the present invention. The panel 1 has at least a through hole 11. The light-guiding device comprises a sleeve part 2 and a light guide 3. In general, the panel 1 has a plurality of through holes 11 equally spaced on a surface of the panel 1 for acting as heat exchanging paths and observation holes from which users are able to monitor statuses of an indicator light. In the preferred embodiment embodiment, the through holes 11 corresponding to the positions of the indicator lights are all in the shape of an ellipse, that may function as marking the installation position of the light-guiding device and bring the effect of directivity orientation after installation. However, one skilled in the pertinent art can easily understand that the shape of the through hole 11 does not affect the applied scope of the present invention. In other embodiments, the through hole with, such as circular shape, may be applied to a panel, and it is not limited by this embodiment.

Figure 2:
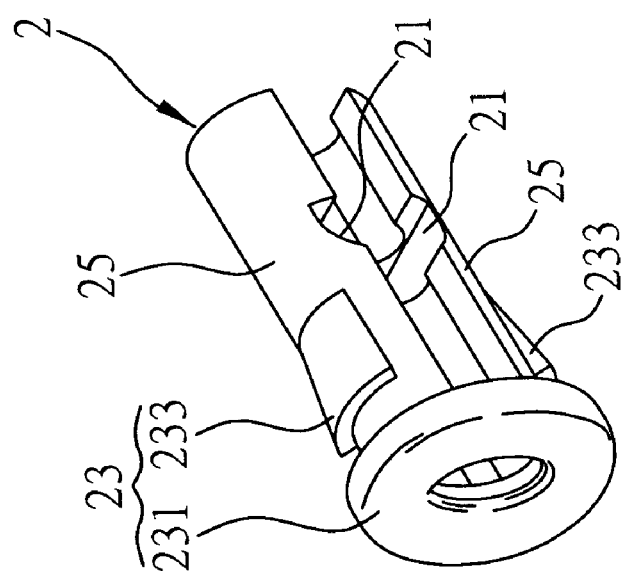
FIG. 2 is a schematic diagram illustrating a sleeve part of the light-guiding device shown in FIG. 1.

FIG. 2 is a schematic diagram illustrating the sleeve part 2 of the light-guiding device according to the present invention. The sleeve part 2 comprises a first combining portion 21 and a positioning portion 23 corresponding to the panel 1 for positioning the sleeve part 2 on the panel 1. In the preferred embodiment, the sleeve part 2 further comprises a holding portion 25. The holding portion 25 comprises two holding parts symmetrically installed a predetermined distance apart from each other for generating corresponding recovery elasticity after being expanded and distorted. The first combining portion 21 is formed on an inner side of the holding portion 25 and has for example a groove structure. More particularly, the first combining portion 21 (such as a groove) is installed in a middle region of the holding portion 25 (such as two holding parts) and perpendicular to the holding portion 25. The first positioning portion 23 is used to fix to the panel 1. According to the preferred embodiment, the positioning portion 23 comprises a sleeve head 231 formed at an end of the sleeve part 2, and an inverted hook 233 formed on an outer side of the holding portion 25. The sleeve head 231 has an annular structure and is larger than the through hole 11 of the panel 1 in width. Moreover, the inverted hook 233 keeps away from the sleeve head 231 a distance equal to a depth of the through hole 11 of the panel 1.

Figure 3:
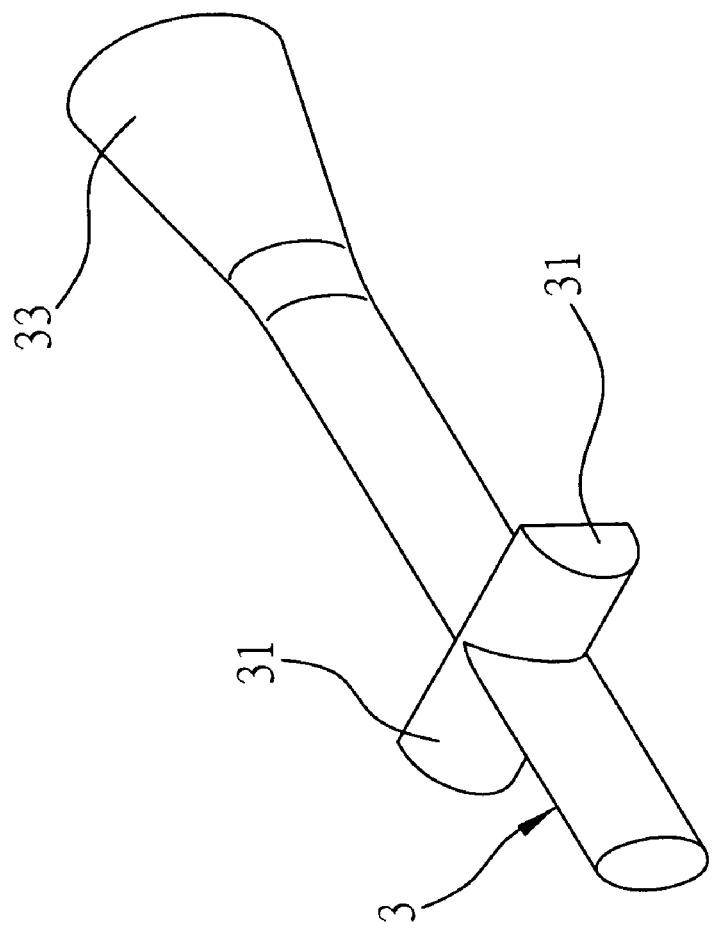
FIG. 3 is a schematic diagram illustrating a light guide of the light-guiding device shown in FIG. 1.

FIG. 3 is a schematic diagram illustrating the light guide 3 of the light-guiding device according to the present invention. The light guide 3 comprises a second combining portion 31, which is able to engaged with the first combining portion 21. According to the preferred embodiment, the light guide 3 is a light-guiding pillar. The second combining portion 31 is for example a bump formed on an outer side of the light guide 3. The light guide 3 further comprises an expanding portion 33 having a conical structure and is formed at an end of the light guide 3. The expanding portion 33 expands a light reception area on the end of the light guide 3, and thus enhances light reception and light conduction efficiencies. Furthermore, in order to obtain a better light-guiding effect, the light guide 3 is made of acrylic, and has a photo-resistive layer attached on the outer surface of the light guide 3 to prevent conductive light inside the light-guiding 3 from leaking to a region outside of the light guide 3, such that affects the effect of light conduction or interferes other light guides 3.

Figure 4:
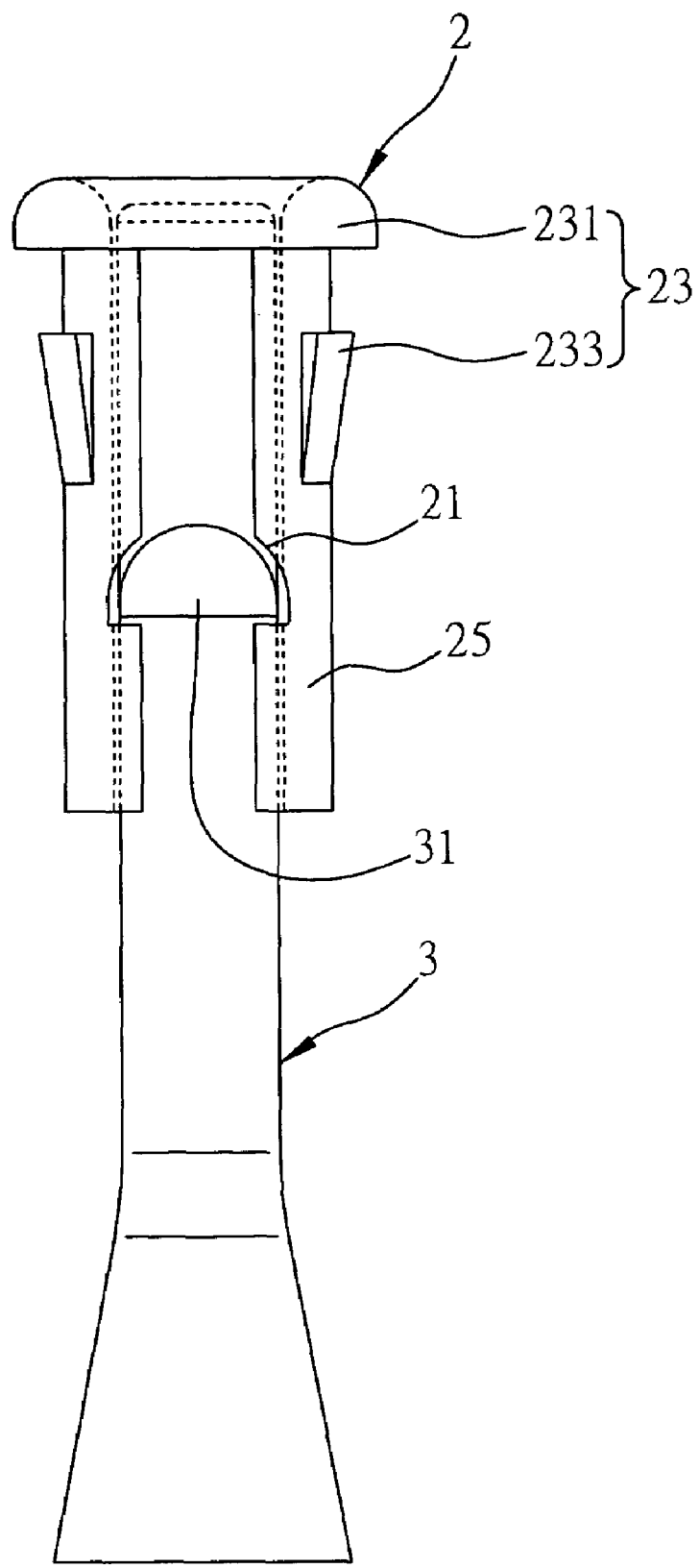
FIG. 4 is a side view illustrating an installation of the sleeve part onto the light guide according to the present invention.

FIG. 4 is a side view illustrating an installation of the sleeve part 2 on the light guide 3 according to the present invention. The light guide 3 is held in the holding portion 25 of the sleeve part 2 and fixed to the sleeve part 2 by the first combining portion 21 and the second combining portion 31. An end of the light guide 3 is inserted in the sleeve head 231 of the sleeve part 2. Since the first combining portion 21 is formed on the inner side (i.e. holding side) of the holding portion 25, when the light guide 3 holds open the holding portion 25 and is installed on a corresponding position, the first combining portion 21 holds the second combining portion 31 automatically due the recovery elasticity of the holding portion 25, and the light guide 3 is positioned on the sleeve part 2 accordingly. Thus, the installation of the light guide 3 on the sleeve part 2 becomes very convenient. On the other hand, the light guide 3 is easily escaped from sleeve part 2 by expanding the holding portion 25 outward.

Moreover, since the holding portion 25 comprises two symmetrically holding parts, which generate the recovery elasticity after being expanded or being compressed, when the light guide 3 is installed in and held by the holding portion 25, a compression space of the holding portion 25 is limited, so as to realize the function of locating the positioning portion 23 on the panel.

Figure 5A:
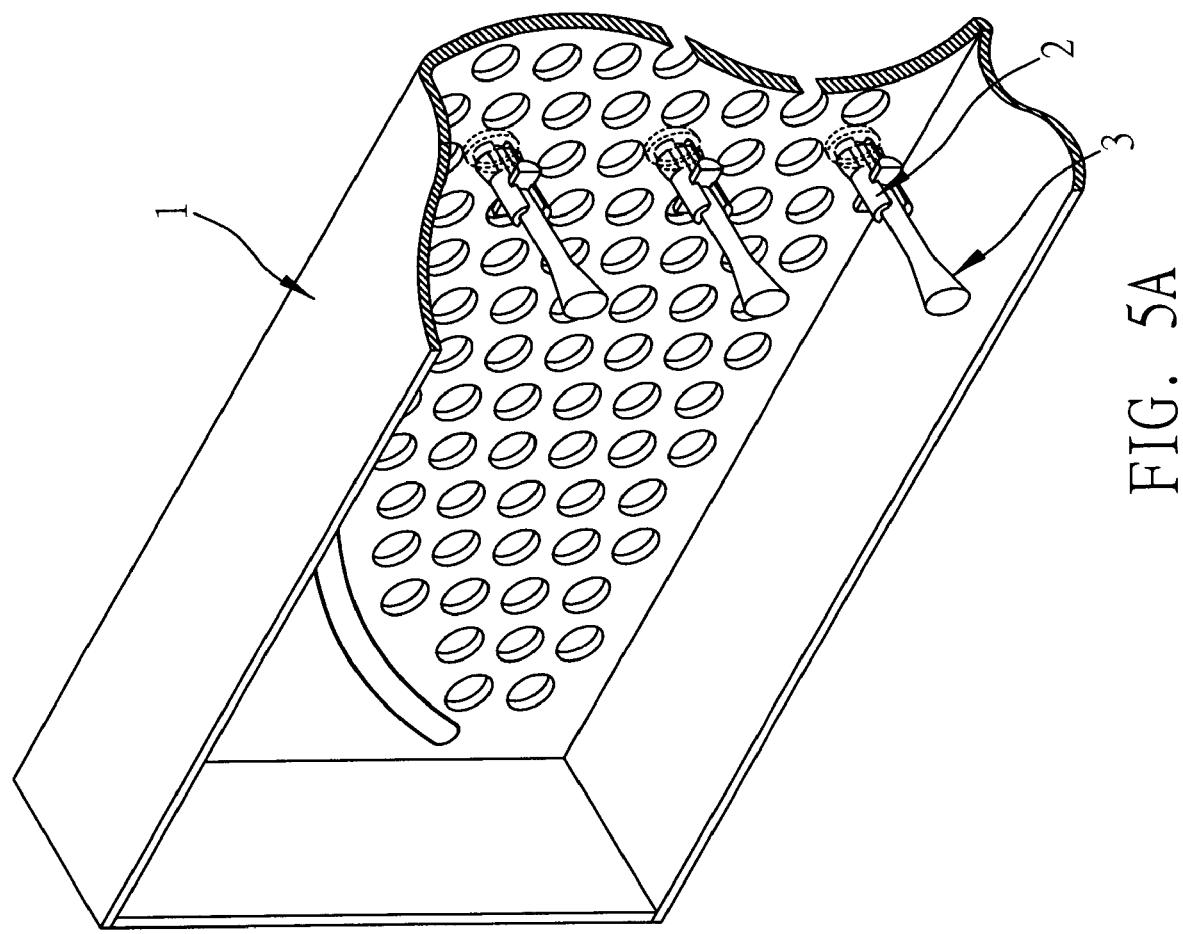
FIG. 5A is a schematic diagram illustrating the light-guiding device and the panel after the light-guiding device has been fixed to the panel.
Figure 5B:
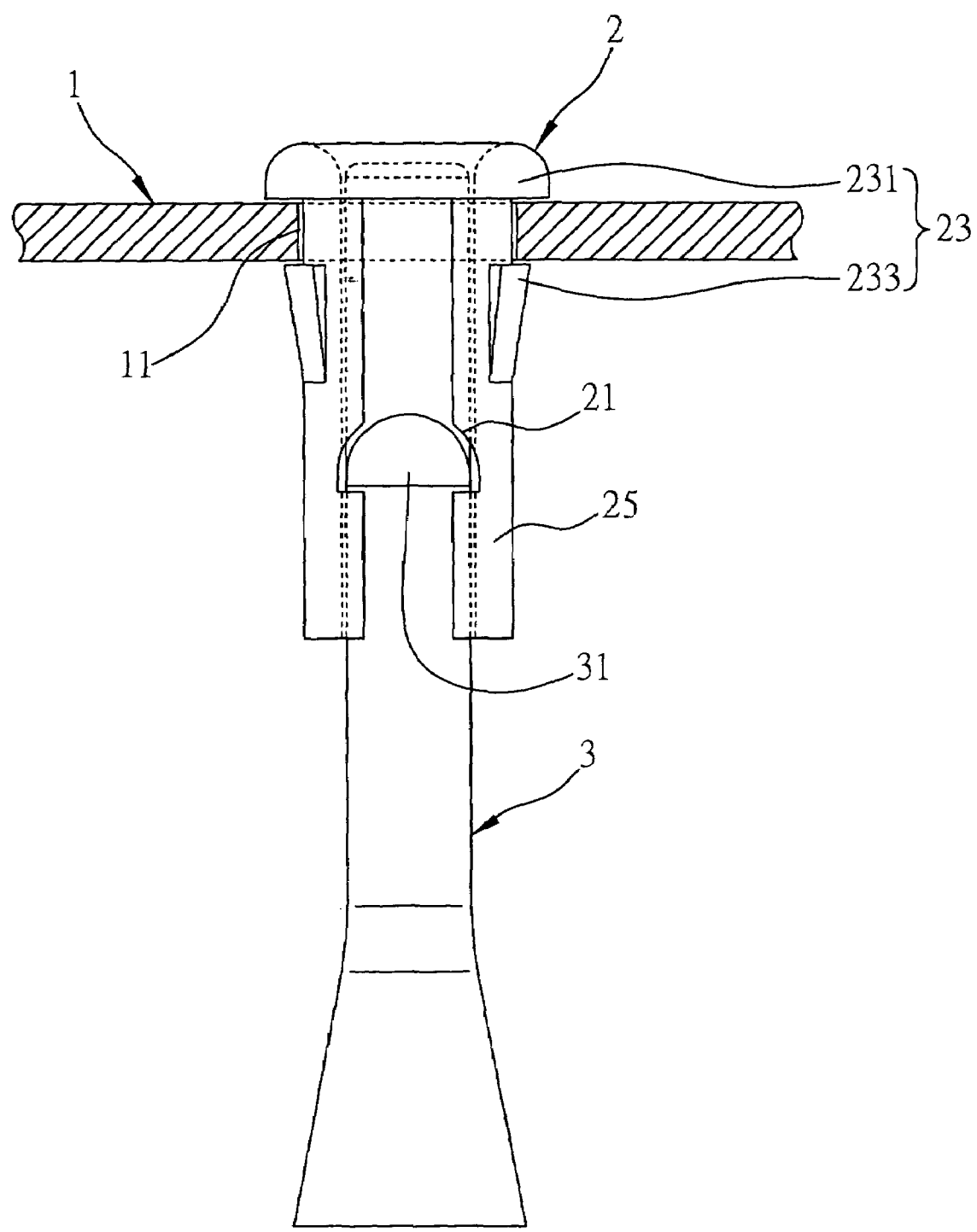
FIG. 5B is a side view the light-guiding device and the panel after the light-guiding device has been fixed to the panel.

FIG. 5A is a schematic diagram illustrating the light-guiding device and the panel 1 after the light-guiding device has been fixed to the panel 1. FIG. 5B is a side view the light-guiding device and the panel 1 after the light-guiding device has been fixed to the panel 1. Firstly, the sleeve part 2 is installed in the corresponding through hole 11 from a region outside of the panel 1, and is fixed to the panel 1 by the positioning portion 23. Since the inverted hook 233 has an oblique guiding surface design, the holding portion 25 will be guided to shrink inward when the sleeve part 2 is passing through the through hole 11, and the inverted hook 233 is hooked to an inside surface of the panel 1 by the recovery elasticity of the holding portion 25 when the sleeve head 231 presses against the outside surface of the panel 1, so as to realize the function of locating the positioning portion 23 on the panel 1.

After the sleeve part 2 is positioned on the panel 1 as described above, then the light guide 3 is assembled to the sleeve part 2, such that the light-guiding device of the present invention is fixed to the panel 1. Since the compressed space of the holding space 25 is limited by holding the light guide 3 in the holding portion 25 after the installation of the light guide 3 and the sleeve part 2, the holding portion 25 cannot be compressed at that time, and then the inverted hook 233 of the positioning portion 23 is relative in a fixed status, so as to ensure the locating effect of the positioning portion 23 and the panel 1.

Although the implementation technique of the first and second combining portions is described by for example, a groove-bump fasten design in the above embodiment, however, one skilled in the pertinent art can easily understand the fastening design of the groove and bump is only an example of combining structures, any design such as, buckle groove and protruding edge, internal thread and external thread, and tightly co-operated taper, may realize the same combining effect. Therefore, the first and second combining portions of the present invention are not limited by the groove and bump of the above embodiment.

Furthermore, although the implementation technique of the positioning portion is described by for example, a sleeve head and an inverted hook design in the above embodiment, however, one skilled in the pertinent art can easily understand the clamping design of the sleeve head and an inverted hook is only an example of combining structures, any design that utilizes the sleeve part's shape design or matches the installation of the light guide can implement the same clamping locating effect, such as matching the sleeve head and the shoulder part preformed on the light guide, or simply utilizing the mutual installation of the sleeve part and light guide to force the sleeve head to expansively locate, and so on. Therefore, the positioning portion of the present invention is not only limited by the design including the sleeve head and inverted hook of the above embodiment.

It can be understood by synthesizing the above embodiments, the light-guiding device of the present invention utilizes a design of the second combining portion of the light guide to match with a design of the first combining portion and positioning portion, so as to realize the effect of fixedly installing on the panel, to provide the effect of assembling and disassembling easily, and to provide the effect of reusable light guide and sleeve part. At the same time, since the structure design is simple and the whole panel does not need to be replaced when the light guide damages, it has the effect to reduce the cost, so as to overcome the defects of the conventional technique, such as hard to assemble and disassemble, complicated structure, low reuse ability, high cost, and so on.

Although the foregoing embodiment was chosen and described in order to best explain the principles of the invention and its practical application, it is not intended to limit the scope of the present invention, but rather to enable others skilled in the art to best understand and utilize the invention with various modifications as are suited to the particular use contemplated. The scope of the invention is defined by the following claims and their equivalents.

What is claimed is:

1. A light-guiding device applicable to a panel having at least a through hole, the light-guiding device comprising:
    a sleeve part capable of being received in the through hole, the sleeve part comprising a first combining portion and a positioning portion corresponding to the panel for positioning the sleeve part on the panel, wherein the positioning portion comprises a sleeve head formed at an end of the sleeve part and an inverted hook formed on an outer side of the sleeve part, and a part of the panel is restricted between the sleeve head and the inverted hook; and
    a light guide having a second combining portion for directly engaging with the first combining portion, so as to fix the light guide onto the panel in cooperation with the sleeve part.

2. The light-guiding device of claim 1, wherein the sleeve part further comprises a holding portion, and the first combining portion is formed on a side of the holding portion, and the holding portion holds the light guide.

3. The light-guiding device of claim 2, wherein the first combining portion is a groove formed on an inner side of the holding portion.

4. The light-guiding device of claim 2, wherein the holding portion comprises two holding parts for holding the light guide.

5. The light-guiding device of claim 1, wherein the second combining portion is a bump formed on an outer side of the light guide.

6. The light-guiding device of claim 1, wherein the light guide further comprises an expanding portion.

7. The light-guiding device of claim 6, wherein the expanding portion is a conical structure formed at an end of the light guide.

8. The light-guiding device of claim 1, wherein the light guide is an acrylic light-guiding pillar.

\* \* \* \* \*